Feb. 11, 1941.   F. H. GULLIKSEN   2,231,499
REGULATOR SYSTEM
Filed Sept. 7, 1939
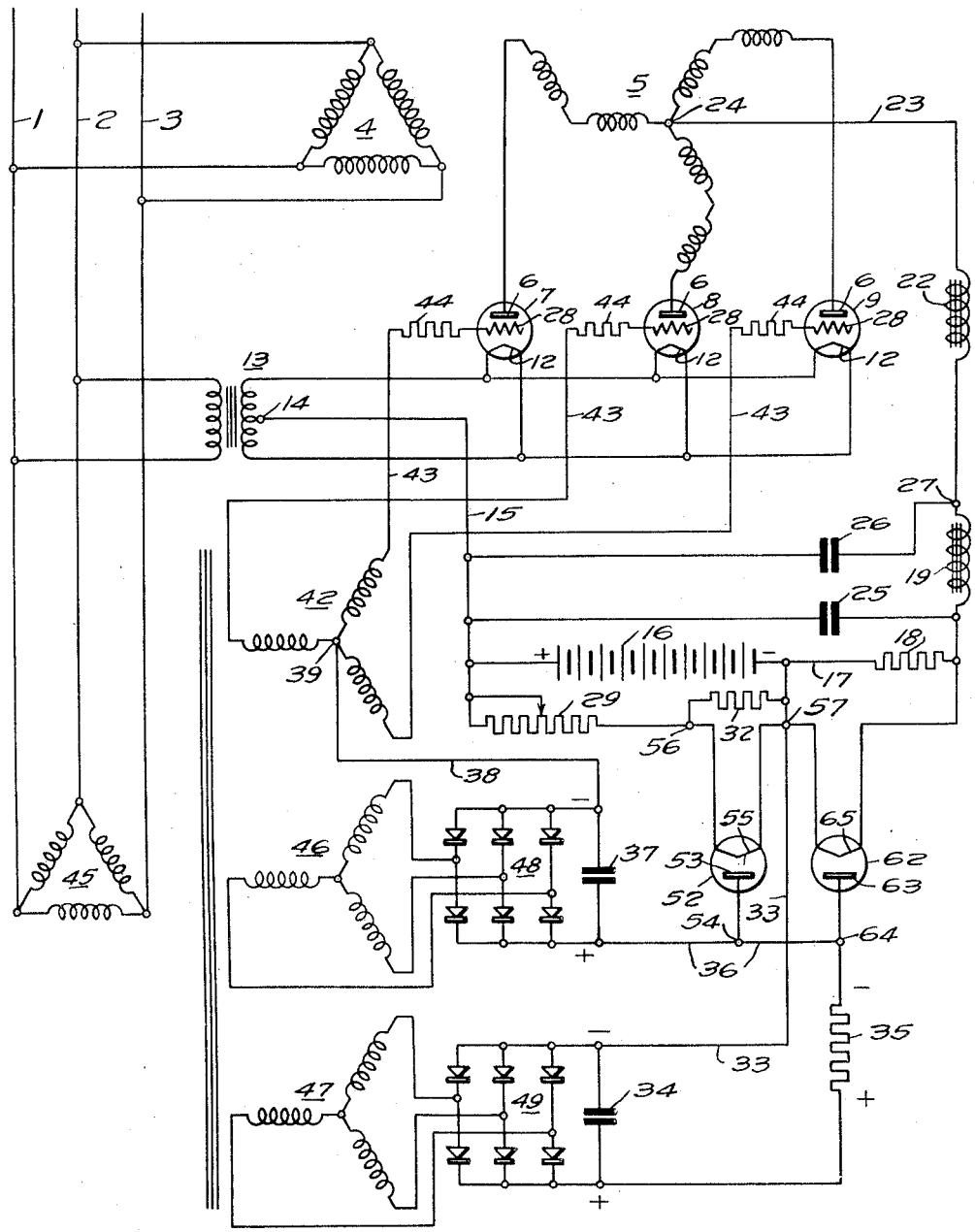
WITNESSES:
E. A. McCloskey.
Nw. C. Groome.
INVENTOR
Finn H. Gulliksen.
BY
Franklin E. Hardy
ATTORNEY Patented Feb. 11, 1941

2,231,499

UNITED STATES PATENT OFFICE 2,231,499

REGULATOR SYSTEM

Finn H. Gulliksen, Pittsburgh, Pa., assignor to Westinghouse Electric & Manufacturing Company, East Pittsburgh, Pa., a corporation of Pennsylvania Application September 7, 1939, Serial No. 293,727

6 Claims. (Cl. 175—363)

My invention relates to apparatus for supplying unidirectional current to a load circuit from an alternating-current source, and more specifically to a system for regulating a rectifier, the output of which is controlled by the characteristics of the load circuit being supplied therefrom.

It is an object of the invention to provide a regulated rectifier system of the character in which the unidirectional current output from the rectifying apparatus is controlled to supply current to a device or load circuit at a desired voltage.

It is another object of the invention to provide a regulated rectifier equipment in which grid-controlled electronic tubes are employed for controlling the supply of current to a load circuit in accordance with the voltage or current characteristics of the circuit, or both.

Other objects and advantages of the invention will be apparent from a description of a preferred embodiment thereof, reference being made to the accompanying drawing, in which the single figure illustrates circuits and apparatus embodying the invention.

In the drawing, a supply of alternating-current energy is indicated by the conductors 1, 2 and 3 to which the three-phase primary winding 4 of a power or anode transformer is connected, the secondary winding 5 of which is shown as of the Y-connected distributed type, portions of each leg of the Y including windings inductively related to each of the two phases of the three-phase circuit. The outer ends of the secondary winding 5 are connected to anodes 6 of three rectifier tubes 7, 8 and 9 respectively, each of which is provided with cathodes 12 connected to be supplied from the secondary winding of a filament transformer 13, the primary winding of which is shown as connected across conductors 1 and 2.

The circuit from the main transformer winding 5 through the tubes 7, 8 and 9 is continued from the mid-point 14 of the secondary winding of the filament transformer through a load circuit conductor 15 to the positive terminal of a battery 16, through the battery 16, conductor 17, resistor 18, reactors 19 and 22 and by conductor 23 to the neutral point 24 of the main transformer 5. In the illustrated embodiment of the invention, the load circuit conductors 15 and 17 are connected to supply charging current to the battery 16 although the output from the rectifier equipment may be supplied to any other type of load as desired. A condenser 25 is connected in shunt relation to the series connected battery 16 and resistor 18, and a condenser 26 is shown connected between the supply conductor 15 and a junction point 27 between the reactors 19 and 22. The condensers 25 and 26 together with the reactors 19 and 22, serve as a filter to minimize the ripples across the battery terminals between the load circuit conductors.

Each of the rectifier tubes 6, 7 and 8 is provided with a control grid 28, the control circuits of which extend from the cathodes 12 of the respective tubes through the secondary winding of the filament transformer 13 through conductor 15, a voltage adjusting rheostat 29 and a control resistor 32 connected in series between supply circuit conductors 15 and 17 in parallel relation to the battery 16, through conductor 33, capacitor 34, resistor 35, conductor 36, capacitor 37, conductor 38 to the neutral point 39 of an impulse transformer 42, through the several phase windings of the transformer 42, circuit conductors 43 and resistors 44, to the respective grids 28 of the tubes 7, 8 and 9. The three-phase windings 42 of the impulse transformer are inductively related to corresponding phases of primary windings 45 that are supplied with three-phase energy from conductors 1, 2 and 3. Control transformers having secondary three-phase windings 46 and 47 are also shown as inductively related to the primary windings 45. The control transformer 46 is shown as connected to supplying three-phase energy to a six-phase dry-type rectifier unit 48 that is connected to impress a unidirectional voltage across the condenser 37. The condenser 37 is so connected as to introduce a negative bias into the above-traced control grid circuit. The control transformer 47 is connected to supply three-phase energy to a six-phase dry-type rectifier unit 49 that is shown connected to impress a unidirectional voltage across the condenser 34 to introduce a positive bias in the grid control circuit above traced.

A detector tube 52 is provided having an anode 53 connected to a junction point 54 on the conductor 36 between the resistor 35 and the condenser 37, and having a cathode 55 connected to the terminals 56 and 57 of the control resistor 32. It will be noted that the voltage across the cathode 55 of the detector tube, which corresponds to the voltage drop across resistor 32, is a measure of the voltage between load circuit conductors 15 and 17 that is applied across the battery 16. The voltage adjusting rheostat 29 may be so varied that when the desired voltage is applied between the terminals of the battery 16, the voltage across the resistor 32, and the heating of the cathode 55, will represent an intermediate value, thus permitting an intermediate value of current flow from the source represented by the rectifier 49 through the resistor 35, the tube 52 and conductor 33, thus providing an intermediate IR drop in voltage across the resistor 35. If the voltage between conductors 15 and 17 increases above this intermediate or desired value, the voltage across the cathode 55 of the tube 52 correspondingly increases, thus increasing the heating of the cathode 55 and the conductivity of the tube 52, thereby increasing the current flow through the tube 52 and the IR drop across the resistor 35. Since the IR drop across the resistor 35 introduces a negative voltage component into the circuit between the cathodes 12 and the control grids 28 of the tubes 7, 8 and 9, the output from these tubes decreases as the conductivity of tube 52 increases, thus decreasing the voltage applied to the conductors 15 and 17. Conversely, if the voltage between conductors 15 and 17 reduces below the intermediate value for which the detector tube is adjusted, the decrease in the heating of the cathode 55 causes a decrease in the conductivity of the tube 52, with a consequent decrease in current flow therethrough, so that the negative bias or voltage drop across the resistor 35 is reduced, thus making the grids 28 more positive with respect to the cathodes 12 and increasing the voltage output from the tubes 7, 8 and 9.

A detector tube 62 is provided having an anode 63 connected to the conductor 36 at junction point 64 and a cathode 65, the terminals of which are connected across the resistor 13 in series with load circuit conductor 17 and with the battery 16 that is being charged. The tube 62 functions in exactly the same way as the tube 52 excepting that the cathode 65 thereof is sensitive to the voltage drop across the resistor 18, which is a measure of the current flowing in the load circuit conductor 17. If the current flow to the battery 16 increases above the desired value, the increasing conductivity of the tube 62 caused by the increasing voltage applied across the terminals of the cathode 65 causes an increased current flow from the rectifier unit 49 through resistor 35 to increase the negative bias on the grids 28 of the rectifier tubes 7, 8 and 9, thus decreasing the output voltage from these rectifiers. Conversely, a decrease in the current flow through the series resistor 18 decreases the current flow in the local circuit from the rectifier 49 through resistor 35. The equipment may be so adjusted that until the current through the resistor 18 increases above some predetermined value, the effect of the tube 62 on the grid control circuits of tubes 7, 8 and 9 is negligible, the tubes being controlled substantially wholly by the detector tube 52 until the current through the load circuit has reached the desired maximum value to be permitted, under which load circuit condition, the tube 62 takes over the control of the equipment to limit the load current at substantially the desired value.

It will be apparent to one skilled in the art that many modifications in the circuits and apparatus illustrated and described may be made within the spirit of my invention, and I do not wish to be limited otherwise than by the scope of the appended claims.

I claim as my invention:

1. In apparatus for supplying unidirectional current to a load circuit from an alternating-current source, rectifier means for supplying a unidirectional current to said load circuit, means for controlling the output of said rectifier means comprising a grid-control circuit, and means for introducing a control potential into said grid-control circuit including a hot cathode type tube and means for varying the cathode voltage thereof in accordance with the voltage of said load circuit, and a hot cathode type tube having its cathode energized in response to variations in the load circuit current for controlling the grid voltage to limit the load current.

2. In apparatus for supplying unidirectional current to a load circuit from an alternating-current source, rectifier means for supplying a unidirectional current to said load circuit, means for controlling the output of said rectifier means comprising a grid-control circuit, means for introducing a control potential into said grid-control circuit including a resistor in said grid-control circuit and a hot cathode type tube for controlling the voltage drop across said resistor, said tube having its cathode energized in response to variations in the voltage across the load circuit conductors, and a hot cathode type tube having its cathode energized in response to variations in the load circuit current for controlling the grid voltage to limit the load current.

3. In apparatus for supplying unidirectional current to a load circuit from an alternating-current source, grid-controlled rectifier means for supplying a unidirectional current to said load circuit, means for controlling the output of said rectifier means comprising a grid-control circuit therefor, means for introducing a control potential into said grid-control circuit including a resistor in said grid-control circuit and a source of unidirectional voltage connected across said resistor, a hot cathode type tube connected to control the flow of current from said source through said resistor and having its cathode energized in response to variations in the voltage across the load circuit conductors, and a hot cathode type tube having its cathode energized in response to variations in the load circuit current for controlling the grid voltage to limit the load current.

4. In apparatus for supplying unidirectional current to a load circuit from an alternating-current source, rectifier means for supplying a unidirectional current to said load circuit, means for controlling the output of said rectifier means comprising a grid-control circuit, means for introducing a control potential into said grid-control circuit including a hot cathode type tube and means for varying the cathode voltage thereof in accordance with the voltage of said load circuit, and a hot cathode type tube having its cathode energized in response to variations in the load circuit current for controlling the grid voltage to limit the load current.

5. In apparatus for supplying unidirectional current to a load circuit from an alternating-current source, rectifier means for supplying a unidirectional current to said load circuit, means for controlling the output of said rectifier means comprising a grid-control circuit, means for introducing a control potential into said grid-control circuit including a resistor in said grid-control circuit and a hot cathode type tube for controlling the voltage drop across said resistor, said tube having its cathode energized in response to variations in the voltage across the load circuit conductors, and a hot cathode type tube connected in shunt to said resistor and having its cathode energized in response to variations in the load circuit current.

6. In apparatus for supplying unidirectional current to a load circuit from an alternating-current source, grid-controlled rectifier means for supplying a unidirectional current to said load circuit, means for controlling the output of said rectifier means comprising a grid-control circuit therefor, means for introducing a control potential into said grid-control circuit including a resistor in said grid-control circuit and a source of unidirectional voltage connected across said resistor, and a hot cathode type tube connected to control the flow of current fom said source through said resistor having its cathode energized in response to variations in the voltage across the load circuit conductors, and a hot cathode type tube connected to control the flow of current from said source through said resistor having its cathode energized in response to variations in the load circuit current for controlling a component of the grid voltage to limit the load current.

FINN H. GULLIKSEN.